KELSEY & McLAIN.
Gate.
No. 62,426.  Patented Feb. 26, 1867.
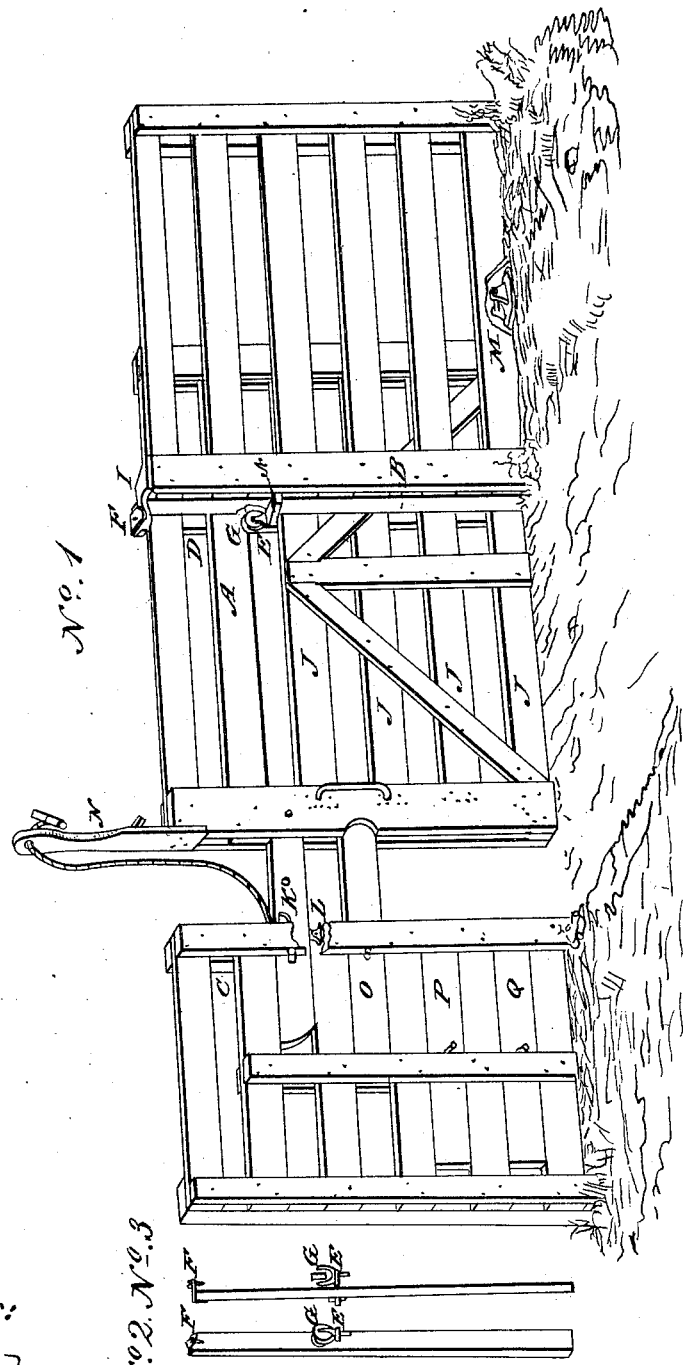

United States Patent Office.

JARED KELSEY AND JOHN McLAIN, OF ST. MARYS, OHIO.

*Letters Patent No. 62,426, dated February 26, 1867.*

IMPROVEMENT IN FARM GATES.

*The Schedule referred to in these Letters Patent and making part of the same.*

TO ALL WHOM IT MAY CONCERN:

Be it known that we, JARED KELSEY and JOHN McLAIN, of the town of St. Marys, in the county of Auglaize, in the State of Ohio, have invented a new and improved mode of making and using a Farm Gate and stock-divide combined; and we do hereby declare that the following is a full and exact description thereof, reference being had to the accompanying drawings, and to the letters of reference marked thereon. The drawings—

Nos. 1 and 2 are perspective.

No. 3, a side view.

This invention relates to the manner of using the gate, it being cheap, easily constructed, and can be handled with ease, being on two rolls, in either opening or shutting, except when swung half round on the large roll. The stock-divide is arranged so that all kinds of stock, from a cow to a pig, may be passed. The weight of the gate when shut is nearly equally divided between the head and tail posts, which prevents it from sagging; neither can snow or ice obstruct its operation; can be opened or shut by a person on horseback, and can be constructed by any ordinary workman.

To enable others to make and use our invention, we will proceed to describe its construction and operation.

A is a gate; B and C head and tail posts; D gate guide, which turns with and acts as a guide and guard to the gate, it being held in position by washers E and F, washer E being placed between flanged roller G; the spike of roll G passes through a hole in said washer and into support H; the spike of washer E passes through gate guide D, and keyed; washer F is attached to top end of gate guide D, and held to place by means of a pin or bolt through cap I. Support H and cap I bear the weight of the gate when in motion. Gate-bars J J J J being shorter than the two upper bars, (as indicated by the dots at head end of the gate,) form a recess for drop-guide bar K; said bar K, after leaving small roll L, drops into said recess, so that when the gate is run back the passage is perfectly free. When guide-bar K leaves roll L, the tail end of the gate strikes roll M, consequently the gate, in opening or shutting, is always on two rolls. N, through which a small cord is passed and attached to drop-guide bar K, is for the convenience of horsemen. By means of stock-bars O P Q, slid into the recess in the end of the gate, (it being opened the required distance,) stock can be separated, counted, or left to range at will. Lower bar Q, slid into the recess, the gate being shut, acts as a complete lock against hogs or other animals.

We do not claim broadly the gate and all the parts thereto, but we do claim as our invention, and desire to be secured by Letters Patent—

The drop-guide bar K, stock-divide and hog lock O P Q, horseman's arrangement N, gate guide D, the washers E and F, and the mode and manner in which the different parts are combined, as herein described for the use set forth.

JARED KELSEY,
JNO. McLAIN.

Witnesses:
JNO. KELLER,
BENJ. WELNY.